Sept. 7, 1954        N. HEIMBACH ET AL        2,688,539
INTEGRAL MASKING OF PHOTOGRAPHIC SILVER HALIDE EMULSIONS
ARRANGED IN CONTIGUOUS LAYERS AND CONTAINING COLORLESS
COLOR FORMERS AND AZO SUBSTITUTED COUPLING COMPONENTS
Filed Nov. 8, 1951
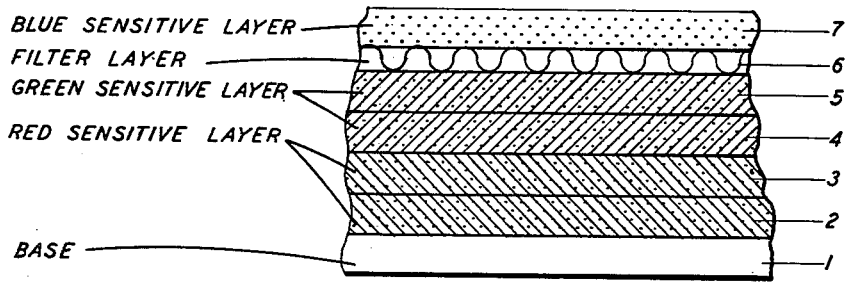
FIG. 1
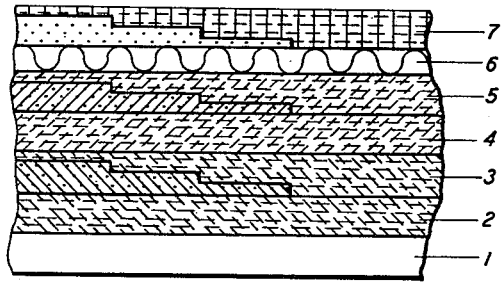
FIG. 2
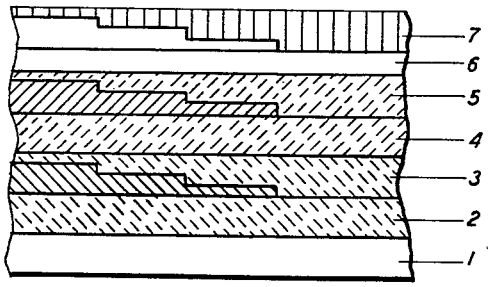
FIG. 3
KEY
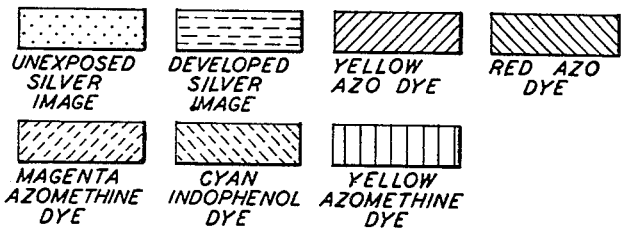
INVENTORS
NEWTON HEIMBACH
HERBERT MORREALL JR.
BY
ATTORNEYS Patented Sept. 7, 1954

2,688,539

UNITED STATES PATENT OFFICE 2,688,539

INTEGRAL MASKING OF PHOTOGRAPHIC SILVER HALIDE EMULSIONS ARRANGED IN CONTIGUOUS LAYERS AND CONTAINING COLORLESS COLOR FORMERS AND AZO SUBSTITUTED COUPLING COMPONENTS

Newton Heimbach, Rochester, and Herbert Morreall, Jr., Binghamton, N. Y., assignors to General Aniline & Film Corporation, New York, N. Y., a corporation of Delaware Application November 8, 1951, Serial No. 255,444

10 Claims. (Cl. 95—2)

This invention relates to the production of colored images in photographic elements by color forming development, and particularly to color negatives containing masking images for color correction by the use of emulsions arranged in contiguous layers, one of said layers containing a colorless color former and the other layer containing an azo substituted coupling compound, and to a process of producing said color negatives.

In the production of color prints from color transparencies or color negatives, the multilayer transparency or color negative consists of yellow, magenta and cyan images in the different layers. The cyan image represents the red, the magenta image the green, and the yellow image represents the blue record of the original subject. Color prints may be obtained from such transparencies or color negatives by direct printing onto a multilayer reversible color film or paper, or a multilayer positive film or paper, respectively, or by making color separation negatives which are used for making color positive prints.

In color photography, it is well known that dye images are formed by a coupling reaction of an oxidized primary aromatic amine developing agent with a suitable organic compound having an active methylene or reactive ethenol group. As development proceeds, the corresponding azomethine or indophenol dyes are formed in situ with the silver image. Speed and gradation control are readily accomplished in the usual dye coupling process, but difficulties are encountered in the proper selection of the dyes and the inherent defects of the dyes which are available. The presently available cyan and magenta dyes are not ideal in their absorption characteristics for allowing color reproductions which are perfectly true in their color hues. Since it has not been possible to find dyes which have ideal absorption characteristics, numerous methods have been devised for making corrections in the imperfect absorption of said dyes.

Generally, it is a simple matter to find yellow dyes or pigments possessing acceptable absorption characteristics and requiring no correction in color printing processes. The same is not true, however, of the magenta and cyan dyes. The magenta dyes, in addition to their failure to absorb the green portion of the spectrum completely, usually show considerable imagewise blue absorption which is most undesirable in subsequent color printing operations where it will interfere with, or degrade, the final picture quality. The available cyan dyes are also imperfect in their absorption characteristics and generally show a considerable absorption in the blue and green regions. To compensate for these deficiencies in the absorption by the magenta and cyan dyes, it is necessary to apply color correction or so-called "masking methods" in order to obtain color prints with true tonal values.

One well known method of obtaining such color correction consists in making a weak positive from one color record and superimposing this positive mask on a second color record when printing from the latter record. In this case, an additional film and printing operation are essential to provide the color correction mask. Furthermore, the problem of securing proper registration of the two images makes this method complicated to say the least.

It has also been proposed to incorporate in a multilayer film containing color forming components, a separate emulsion layer and to convert this separate layer by special and complicated processing steps into a masking layer. The complexity and difficulties attendant upon such procedures are well known to those skilled in the art.

Another method of obtaining color correction consists of utilizing a multilayer color film in which at least one of the layers contains a single non-migratory color forming azo dye. After exposing and processing, the final picture obtained in the layer consists of two separate images, i. e., a positive residual azo dye image and a negative azomethine, or indophenol image.

In the latter method, the uncoupled portion of the azo dye forms the masking positive image. The coupling process involved is based on the assumption that the absorption of the residual azo coupler and the undesired absorption of the negative color images are nearly equal. In actual practice, the equality of the respective absorptions is not always attained and errors are introduced. These errors are caused by the fact that azo dyes impart an excessive intense color to the emulsions, especially when employed in concentrations sufficient to obtain images of adequate density. Moreover, azo dyes when used alone yield masking effects which are not constant but vary with the overall density of the developed image.

Furthermore, the coupling rate of a large number of azo substituted color formers is somewhat slower than that of the corresponding colorless color formers. When an azo substituted color coupler is employed in admixture with a colorless color coupler, the former is not as fully developable as the latter and the former slows down the effective emulsion speed of the latter. In most cases, the gradation of layers of different color is of such a different nature that the layers are not compatible with each other.

Moreover, the utilization of colored and colorless color formers in a single emulsion layer poses the problem of finding a single sensitizing dye which is compatible with both. This is very difficult in some cases and in others impossible.

It is an object of the present invention to overcome the foregoing disadvantages by providing a multilayer photographic color film in which two emulsions sensitized to the same spectral color are arranged in contiguous layers, one of said layers containing a colorless color former and the other layer containing an azo substituted coupling compound.

A further object is to provide a multilayer color film containing colored and colorless coupling compounds in separate emulsion layers which upon exposure and color development will yield balanced masking and developed negative images.

A still further object is to provide an improvement in color correction of a multilayer color film by which it is possible to compensate not only for the difference in the coupling rate of a colored masking coupler, but also equalize otherwise intolerable differences in color gradation.

Other objects and advantages will be more apparent by reference to the foregoing specification.

It has been found that it is possible to maintain the effective coupling rate of the colorless color couplers without impairing or slowing up the coupling rate of the azo substituted color formers and to obtain effectively balanced masking and developed negative images by employing a multilayer color film in which the silver halide emulsion layers sensitized to red, green and blue light rays, respectively, are arranged in contiguous layers, and at least one of said layers contains a colorless color former and the other layer sensitized to the same spectral color contains an azo substituted coupling compound. By employing the colored and colorless components in separate emulsion layers, the coupling rate of the color formers in each of the contiguous layers is undisturbed, and the color gradation in each layer equalized. In other words, the masked images formed in the layer containing the azo substituted coupling compound and the developed negative images formed in the layer containing the colorless component are balanced for the whole density range of both layers.

The dyestuffs consisting of coupling components containing an azo group in the reactive color coupling position, when utilized in one of the layers, split during development to provide components reactive with the oxidation products of the developer to yield subtractively colored azomethine and indophenol dye images. The color of these dye images will depend upon the particular reactive groups which are present in the azo substituted color formers, i. e., active methylene and ethenol groups. The original azo substituted color formers located in the unexposed portions of the layers are unaffected by the processing baths and are retained in their original condition in the final processed film. This means that after the processing of the film, there is present in the emulsion layer treated, a positive azo dyestuff image and a negative azomethine or indophenol dyestuff image. It is this peculiarity of the azo substituted coupling components which permits their utilization for the preparation of masked negatives or transparencies, as will be more clearly pointed out hereafter.

The azo substituted color formers which are utilized in at least one of the contiguous layers, preferably in the cyan or magenta layer, are characterized by the following general formula:

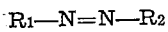

wherein $R_1$ is an aromatic radical, e. g., phenyl, naphthyl, diphenyl, tolyl, alkoxyphenyl, i. e., methoxyphenyl and the like, or a heterocyclic ring system, e. g., substituted or unsubstituted indolenine, lepidine, oxazole, pyridine, quinoline, thiazole, pyrazole and the corresponding substituted or unsubstituted polycyclic compounds, such as benzthiazole, benzoxazole, naphthothiazole and the like, and $R_2$ is a color former containing either an active methylene group attached directly to the azo group or a reactive ethenol group containing the azo substitutent on the carbon atom para to the hydroxyl group.

A color forming active methylene group commonly constitutes a $CH_2$ group activated by neighboring groups, as for example:

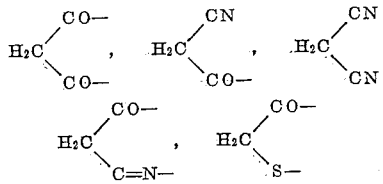

and the like. By "reactive ethenol" group is meant the group

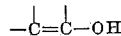

present in phenolic couplers which have color coupling reactivity in the para position with respect to the position of the hydroxyl group.

The above typical active methylene and reactive ethenol groups which may be present in the $R_2$ substituent with their appropriate linkage to the azo group in the above general formula may be represented as:

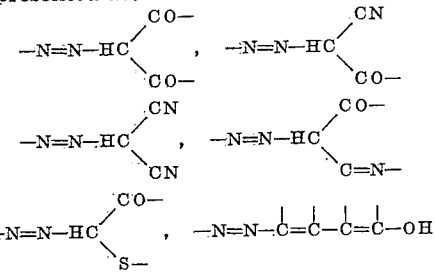

in which the carbon atoms form a part of an aromatic ring, and the like. More specifically, the $R_2$ substituent, containing an active color forming group, may be aliphatic, such as β-keto esters, aromatic, such as phenols, or heterocyclic, such as pyrazolones, so long as the proper azo linkage as described above is contained therein. The $R_1$ and $R_2$ groups may contain a variety of other conventional substituents, such as halogen, e. g., chlorine, bromine, or iodine, alkyl, e. g., methyl, ethyl, propyl, and the like, alkoxy, e. g., methoxy, ethoxy, etc., amino, nitro, hydroxy, acid groups, e. g., arsonic, carboxylic or sulfonic acid or any other conventional group which will not interfere with the coupling activity of the azo substituted color forming compounds.

When incorporating the azo substituted color formers into one of the contiguous layers, it is desirable that the substituents on $R_1$ or $R_2$ or on both be such that they will prevent the color formers from migrating from one layer to another, otherwise color distortion will result upon color forming development. This result may be accomplished in several ways, as for example, by substituting the $R_1$ and $R_2$ groups or both with suitable groups which impart substantive character to the color formers which combine permanently with the gelatin or other colloidal materials of the silver halide emulsion or by enlarging the substituent groups of the color formers as with a long chain alkyl radical so that the color former is incapable of diffusing from the gelatin or other colloidal material. Examples of such methods which render color formers fast to diffusion by imparting substantive character thereto are disclosed in United States Patent 2,179,228. Examples of color formers which are rendered fast to diffusion by enlarging the substituent groups are disclosed in United States Patents 2,178,612, 2,179,234, 2,179,238–9, 2,179,244, 2,186,045, 2,186,719, 2,186,732–3–4, 2,186,849, 2,186,851–2, 2,200,306, 2,280,722, 2,292,575, 2,303,928, and 2,307,399. By reference to the latter patents, it will be noted that the color formers are modified by the inclusion of radicals of resins, polypeptides, hydrogenated ring systems, carbohydrates, long chain alkyls, and by having the substituent radical recur a number of times in the final molecule.

The color formers in which $R_1$ contains a non-diffusing group are readily prepared by coupling a diazotizable non-diffusing amine with a color coupler, such as 1-naphthal as exemplified by Illustration 16. Alternatively, the non-diffusing group may be introduced in a final step after coupling, for example, diazotized p-nitroaniline with 1-naphthol, reducing the nitro group and introducing a stearoylamino group with the aid of stearoyl chloride as exemplified by Illustration 15. It is to be understood that the substituent groups of the color formers of the present invention, in addition to those previously mentioned, include substantive groups or molecular enlarging groups for the purpose of rendering the color formers fast to diffusion. Best results ensue when using for this purpose the long alkyl chains, and the resort to such radicals to prevent migration of the color formers is preferred.

The colorless color formers disclosed in the foregoing patents are employed for the preparation of the three separate emulsion layers of a multilayer color film in accordance with the present invention.

Instead of rendering the azo substituted color formers fast to diffusion by any one of the above methods, the color formers may be confined or localized to a single layer, i. e., made fast to diffusion by incorporating in a sensitive emulsion and associating them with a resin or gum as described in United States Patents 2,269,158, 2,266,443, 2,272,191, 2,284,877, 2,289,803, 2,304,940, and 2,311,020.

The procedure for synthesizing the azo substituted compounds containing one or more non-diffusing or molecular enlarging groups is to react the cyan color formers disclosed in United States Patents 2,156,821, 2,179,239, 2,224,329, and 2,357,394–5, and the magenta color formers disclosed in United States Patents 2,179,239, 2,186,045, and 2,200,306 with a diazonium salt, such as p-sulfophenyl diazonium chloride, 5,7-disulfonaphthalene-1-diazonium chloride, thiazole diazonium chloride, benzenediazonium chloride, 4-sulfonaphthalene-1-diazonium chloride, and the like.

Azo substituted cyan and magenta color formers fast to diffusion prepared according to the above procedure are the following:

(1)
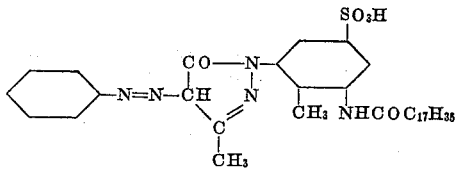
1-[3'-sulfo-5'-stearoylamino-6'-methylphenyl]-3-methyl-4-phenylazo-5-pyrazolone (2)
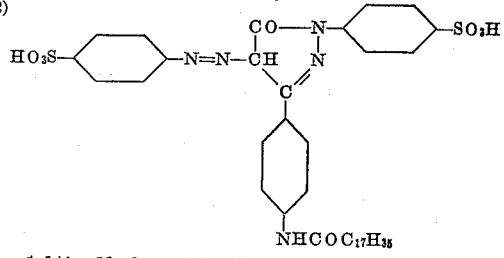
1-[4'-sulfophenyl]-3-[4''-stearoylaminophenyl]-4-[4'''-sulfophenylazo]-5-pyrazolone (3)
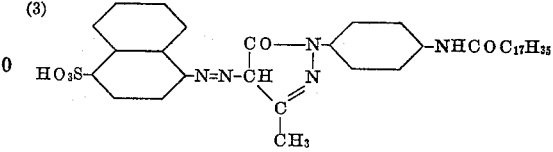
1-[4'-stearoylaminophenyl]-3-methyl-4-[4''-sulfonaphthaleneazo]-5-pyrazolone (4)
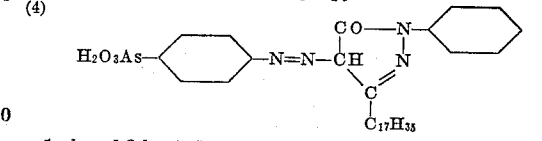
1-phenyl-3-heptadecyl-4-[4'-arsonic acid phenylazo]-5-pyrazolone (5)
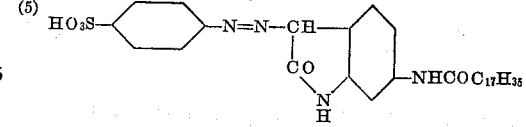
3-[4'-sulfophenylazo]-6-stearoylamino-2-indolinone (6)
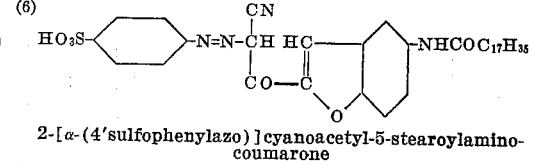
2-[α-(4'sulfophenylazo)]cyanoacetyl-5-stearoylaminocoumarone (7)
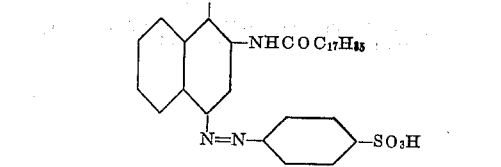
4-[4'-sulfophenylazo]-2-stearoylamino-1-naphthol (8)
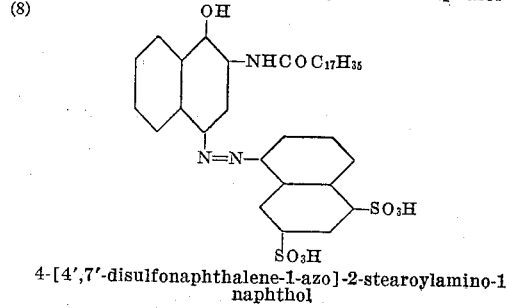
4-[4',7'-disulfonaphthalene-1-azo]-2-stearoylamino-1-naphthol (9)
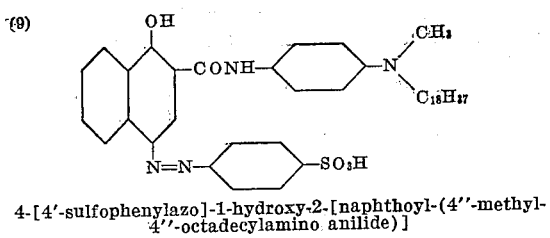
4-[4'-sulfophenylazo]-1-hydroxy-2-[naphthoyl-(4''-methyl-4''-octadecylamino anilide)]

(10)
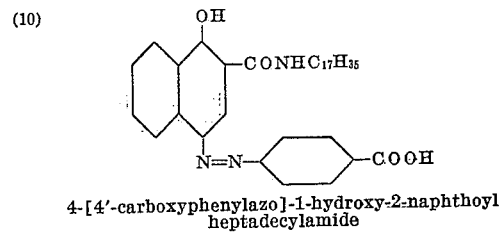
4-[4'-carboxyphenylazo]-1-hydroxy-2-naphthoyl heptadecylamide

(11)
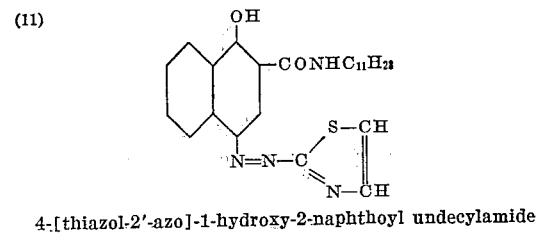
4-[thiazol-2'-azo]-1-hydroxy-2-naphthoyl undecylamide

(12)
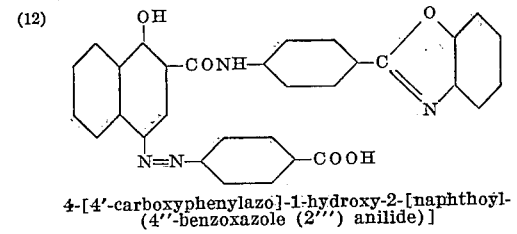
4-[4'-carboxyphenylazo]-1-hydroxy-2-[naphthoyl-(4''-benzoxazole (2''') anilide)]

(13)
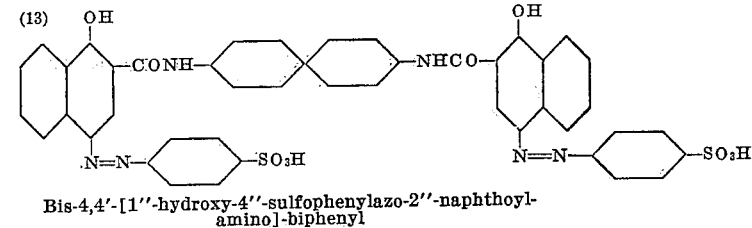
Bis-4,4'-[1''-hydroxy-4''-sulfophenylazo-2''-naphthoylamino]-biphenyl

(14)
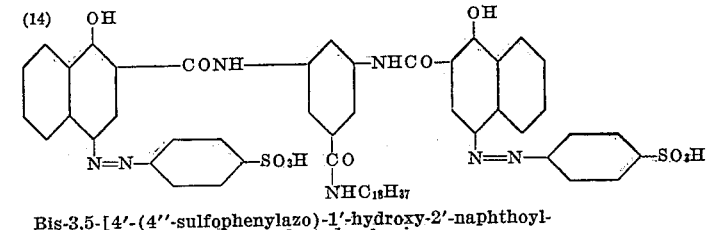
Bis-3,5-[4'-(4''-sulfophenylazo)-1'-hydroxy-2'-naphthoylamino]-benzoyloctadecylamine

(15)
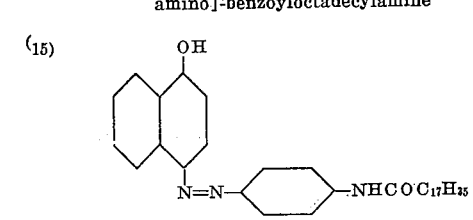
4-[4'-stearoylaminophenylazo]-1-naphthol

This compound can be prepared by reacting p-nitrophenyldiazonium chloride with α-naphthol, reducing the nitro group of the resultant azo dye with ammonium polysulfide or by hydrogenation in the conventional manner and then reacting the resulting product with stearoyl chloride in a solvent such as pyridine.

(16)
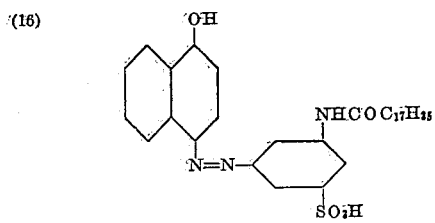
4-[3'-stearoylamino-5-sulfophenylazo]-1-naphthol

This compound is prepared by diazotizing 5-sulfo-3-stearoylaminoaniline and coupling directly with α-naphthol.

(17)
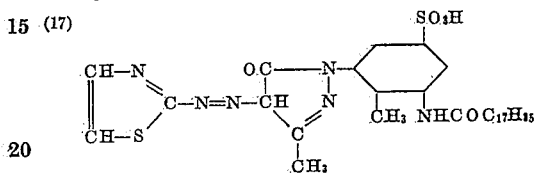
1-[3'-sulfo-5'-stearoylamino-6'-methyl phenyl]-3-methyl-4-[thiazol-2''-azo]-5-pyrazolone The above cyan and magenta color formers are added to any one of the various types of organic colloids known to the art as silver halide carriers, preferably to gelatino silver halide emulsions, in the form of a solution or a suspension in a suitable solvent, such as 1 N-alcoholic sodium or potassium hydroxide, acetone, ethyl alcohol, isopropyl alcohol, etc. Dispersing agents, such as isopropyl naphthalene sulfonic acid or any of the dispersing agents disclosed in United States Patent 2,186,717, may be used in preparing the suspension of the color formers.

During color development with an aromatic primary amine such as, for example, p-phenylenediamine, monoethyl-p-phenylenediamine, diethyl-o-phenylenediamine, 4,4'-diamino-diphenylamine, p-amino-dialkyl anilines, e. g., p-aminodimethyl aniline and p-amino-dialkyl aniline, the azo substituted magenta color formers are converted to azomethine dyes and the azo substituted cyan color formers are converted to indophenol dyes by the action of the oxidized developing agent, with an imagewise displacement of the azo linkage by the imino group of the developed dye images.

A conventional multilayer color film usually consists of a base upon which are superimposed three silver halide emulsion layers. The bottom layer is sensitized to red, the middle layer to green, and the uppermost layer to blue light. Between the top layer and the middle layer, or so-called "magenta layer," is a filter layer of gelatin, containing a yellow dye or a dispersion of colloidal silver. Suitable colloidal silver filter layers are disclosed in United States Patent 2,220,187.

The red sensitive layer contains a non-diffusing color coupling component capable of being developed to a cyan dye image with a primary aromatic amine developing agent. Suitable cyan dye images are produced from the color components disclosed in United States Patents 2,179,238, 2,186,733, and 2,224,329. Specific examples of such color components are, for instance, 3,5 - di - (phenylamino) phenol, abietyl-amino-naphthol, 1-N-stearyl-4-N-(1-hydroxy-2'-naphthoyl)-phenylenediamine sodium sulfonate, and the like.

The green sensitive layer contains a color coupling component capable of forming a magenta dye image with a suitable color developer as above. Suitable color components for the magenta dye image are the non-diffusing components described in United States Patents 2,178,612 and 2,179,238. Examples of such components are the condensation product of meta-amino-phenyl-methyl pyrazolone and the mixed polymer of vinyl chloride and maleic anhydride, and the like.

The blue sensitive layer contains a color coupling component capable of forming a yellow dye image with a color developer as above. Suitable components for this layer are the non-diffusing yellow color components described in United States Patents 2,179,238 and 2,224,329, examples of which are terephthaloyl-bisacetic acid anilide-p'-carboxylic acid, and the like.

The original color film constituted as above described is exposed to a colored object and then developed in a color developer of the following composition:

|  | Grams |
|---|---|
| Diethyl-p-phenylenediamine | 2.0 |
| Sodium carbonate (anhydrous) | 50.0 |
| Sodium sulfite (anhydrous) | 2.0 |
| Potassium bromide | 0.2 |
| Water to make 1 liter. | |

This color development produces negative silver and color images at the exposed portions of the multilayer film. The top layer contains at this step a yellow azomethine dye image together with a negative silver image and unexposed silver halide. The filter layer has not been affected. The magenta layer contains a magenta azomethine negative image, a negative silver image and unexposed silver halide. The cyan layer contains a cyan indophenol negative image, a negative silver image and unexposed silver halide. After color development the film is processed to remove the negative silver images by subjecting it to the action of a suitable silver bleaching bath, such as, for example, a potassium ferricyanide, or potassium sodium ferricyanide-potassium bromide solution, which converts the developed silver and the colloidal silver of the filter layer into hypo-soluble silver salts, or with Farmer's reducer or potassium bichromate in mildly acidic solution whereby the colloidal silver filter layer, and the developed silver images in all three layers are immediately removed. The remaining silver halide and the silver salt obtained by bleaching unless previously removed are then fixed in a fixing bath which will not injure the subtractively colored images. For this purpose, a fixing bath of the following formula was employed:

$Na_2S_2O_3.5H_2O$, 20 grams
Water to make 100 cc.

The material is then washed and after drying is ready for color printing on multilayer color positive paper, film or other color printing or duplicating purposes.

In printing with the color negative film thus prepared, the cyan and magenta dye images are not ideal in their absorption characteristics for allowing color reproductions which are perfectly true in their color hues. The cyan image shows a considerable absorption in the blue. The magenta image absorbs green light in proportion to the image density, and a secondary proportional absorption of blue light also occurs due to the inherent deficiencies of the developed magenta dye. These defects cannot be eliminated readily during printing operations with the result that the "blues" and "greens" of the final print are considerably degraded.

As a specific example of a multilayer color film according to our invention, a support or base, for instance, a cellulose acetate film, carries on its front face two red sensitive layers, into one of which is incorporated a colorless coupler, for the cyan dye negative image, such as, for example, 1-hydroxy - 2 - naphthoyl heptadecylamide, and into the other layer the red azo dye color former, 4 - [4 - carboxyphenylazo] -1- hydroxy -2- naphthoyl heptadecylamide.

It is to be noted that it does not make any difference, in view of the results obtained, which layer is coated first on the support, i. e., the red sensitive emulsion layer containing the colorless color former or the layer containing the red azo dye. The same is true of the magenta layers. However, for practical purposes we found it desirable to coat the first layer of each contiguous layer with a sensitized emulsion containing the colorless color former.

Over these first two red sensitized layers are coated two green sensitive emulsion layers, one containing the colorless color former, 1-[5'-stearoylamino-6'-methyl -3'- sulfophenyl]-3-methyl-pyrazolone, and the other containing 1-[4'-sulfophenyl]-3-[4'' - stearoylaminophenyl]-4-[4'''- sulfophenylazo]-5-pyrazolone.

The uppermost layer is sensitized to blue and contains terephthaloyl-bisacetic acid anilide-p-carboxylic acid as a yellow color former. Between the top layer and the middle layer is a gelatin filter layer containing colloidal silver which prevents blue light from reaching the lower layers.

All of the azo substituted color formers illustrated herein have a coupling rate comparable to the coupling rate of the colorless color formers. It may be possible, however, that some equivalent azo substituted color formers falling within the definition of the above general formula may have a slower coupling rate than that of the colorless color former. In such case all that is necessary to compensate for the slow coupling rate is to increase the sensitivity or speed of the silver halide emulsion layer containing the azo substituted color former. By this simple expedient the coupling rate of both color formers in the contiguous layers will be equalized upon color development. Increasing the sensitivity or speed of a silver halide emulsion is a well known procedure and details thereof need not be described herein.

The invention will be more readily understood when read with the accompanying drawing, in which:

Figure 1 illustrates in section a conventional multilayer color film in which the two green and two red sensitive emulsions are arranged contiguously, the bottom red and green sensitive layers containing conventional color formers and the other red and green sensitive layer containing azo substituted cyan and magenta color forming couplers, respectively.

Figure 2 illustrates the multilayer color film of Figure 1 after development in a color developer.

Figure 3 illustrates the multilayer color film of Figure 2 after bleaching, fixing, and removal of silver halide.

The following examples will serve to illustrate certain ways in which the principle of our invention has been applied, but are not to be construed as limiting the invention.

*Example I*

Referring to the drawing and particularly to Figure 1, a color film similar in construction to that above described is prepared, with the exception that over the bottom red sensitive silver halide emulsion layer 2, containing the color former, 1-hydroxy-2-naphthoyl heptadecylamide, is overcoated with a red sensitive silver halide emulsion layer containing the red azo dye color former, 4-[4'-carboxyphenylazo]-1-hydroxy-2-naphthoyl heptadecylamide, and the bottom green sensitive silver halide emulsion layer, containing the colorless color former, 1-[5'-stearoylamino-6'-methyl-3'-sulfophenyl] - 3 - methyl-5-pyrazolone, is overcoated with a green sensitive silver halide emulsion layer containing the yellow azo dye color former, 1-[3'-sulfo-5'-stearoylamino-6'-methylphenyl]-3-methyl-4-phenylazo-5-pyrazolone. The filter layer and the blue sensitive silver halide emulsion layer are the same as above.

The multilayer film thus prepared is exposed to a colored subject and color developed. After color development, as illustrated in Figure 2, the top layer 7 contains at this stage a yellow colored negative image together with a negative silver image. The filter layer 6 has not been affected. The magenta layer 5 contains a magenta azomethine negative image, a negative silver image and unexposed silver halide together with a residual yellow azo dye image, and the magenta layer 4 contains a magenta azomethine negative image together with a negative silver image. The cyan layer 3 contains a cyan indophenol negative image, a negative silver image, and unexposed silver halide together with a residual red azo dye positive image, and the cyan layer 2 contains a cyan indophenol negative image together with a negative silver image. In the region of the negative silver image of layer 5, the azo group of the yellow dye is displaced imagewise by the azomethine group of the magenta dye. Similarly, in the region of the negative silver 3 of the azo group of the red dye is displaced imagewise by the indophenol group of the cyan dye.

After bleaching, fixing and washing the developed film, as illustrated in Figure 3, the filter layer 6 is removed. The top layer 7 contains at this stage a yellow azomethine dye negative image. The magenta layer 5 now contains a negative magenta azomethine dye image together with a positive yellow azo dye masking image, and the magenta layer 4 contains a negative magenta azomethine dye image. The cyan layer 3 contains a negative cyan indophenol dye image together with a positive reddish azo dye masking image, and the cyan layer 2 contains a negative cyan indophenol dye image. The final dye images of layer 5 in addition to absorbing green light in proportion to the magenta images, absorbs blue light uniformly throughout layers 5 and 4 independently of magenta density due to the presence of the residual yellow azo dye in layer 5. Likewise, the final dye images of layer 3 absorb blue light uniformly throughout layers 2 and 3 independently of the cyan image density due to the presence of the residual red azo dye in layer 3.

In making color prints with this negative material the combined dye images in layers 2, 3, 4, and 5 do not introduce the blue and green degradation which is common to a conventional negative material. By a simple adjustment of printing time and emulsion gradation, a sufficient compensation for overall density of the color negative is obtained. Color photographic copies made from this colored negative are superior to those obtained by using a conventional negative material.

*Example II*

Example I is repeated with the exception that the yellow azo dye color former, 1-[3'-sulfo-5'-stearoylamino - 6' - methylphenyl]-3-methyl-4-phenylazo-5-pyrazolone, and the red azo dye color former, 4-[4'-carboxyphenylazo]-1 - hydroxy-2-naphthoyl heptadecylamide, are replaced by 1-[4'-sulfophenyl]-3-[4''-stearoylaminophenyl]-4-[4'''-sulfophenylazo]-5 - pyrazolone, and 4-[4'-sulfophenylazo]-1 - hydroxy-2-[naphthoyl-(4''-methyl - 4'' - octadecylamino anilide)], respectively. After the usual development, bleaching, fixing, and washing, a negative material is obtained similar to that of Example I. Color photographic copies from this color negative are likewise superior to those obtained by employing a conventional negative material.

*Example III*

The following yellow and red azo dye color formers are employed in separate cyan and magenta layers of multilayer films, respectively, with satisfactory results:

Yellow azo dye color formers exemplified by Illustrations 1 to 6 inclusive, 15, and 16.

Red azo dye color formers exemplified by Illustrations 7 to 14 inclusive and 17.

*Example IV*

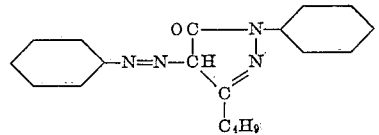

1-phenyl-3-butyl-4-phenylazo-5-pyrazolone

This compound is prepared by diazotizing aniline and coupling directly with 1-phenyl-3-butyl-5-pyrazolone.

One-half gram of the above compound is dissolved in 5 cc. of a 5% solution of colophony in acetone. The solution is then mixed with 100 cc. of a diluted gelatino-silver halide emulsion and the resulting emulsion coated on a suitable support which had been previously coated with a silver halide emulsion containing 1-(5'-stearoylamino-6'-methyl - 3'-sulfophenyl)-3-methylpyrazolone as a colorless color former. When dried, the resulting element is exposed and processed as above. After processing and drying, the lower layer contains a negative magenta image and the upper layer contains a negative magenta azomethine dye image together with a positive yellow azo dye masking image. The dye images in the two layers, in addition to absorbing green light in proportion to the magenta image, absorb blue light uniformly throughout the layers due to the presence of the residual yellow azo dye in the upper layer.

From the specific examples hereinabove set forth, it has been shown that multilayer photographic elements containing in the additional red sensitive layer and in the additional green sensitive layer the usual cyan and magenta color formers fast to diffusion substituted by an aliphatic, aromatic, or heterocyclic azo group, respectively, markedly improve the color rendition of the contiguous red sensitive and green sensitive layers upon color development.

It is understood that the term "color former fast to diffusion," as employed herein and in the appended claims, is used in a generic sense to include color formers fast to diffusion usual in the color photographic art as represented by the above general formula. It is also understood that the term "reddish" as employed herein and in the appended claims, is used in a generic sense to include the various shades of red ranging from orange to red and bluish red which are obtained by the various species of azo substituted coupling compounds disclosed herein. Moreover, their usefulness for the purpose of the present invention is not dependent upon the nature of the $R_1$ and $R_2$ substituents, so long as they are fast to diffusion and contain a reactive methylene group directly attached to the azo linkage, or a reactive ethenol group having an azo substituent on the carbon para to the hydroxyl group.

This application is a continuation-in-part of our application Serial No. 9,686, filed on February 20, 1948, now abandoned, which is a division of our application Serial No. 593,144, filed on May 11, 1945, now abandoned.

We claim:

1. A photographic element comprising superposed silver halide emulsions sensitized selectively to the primary light rays, two of said emulsions being selectively sensitive to the same primary light rays other than blue, and arranged in contiguous layers, one of said layers containing a colorless color former capable of coupling with the oxidation products of a primary aromatic amino developer to yield a dyestuff image in situ with the silver image and complementary in color to that for which said emulsion is sensitized but absorbing light rays other than those for which said emulsion is sensitized, and the other layer containing an azo dye of a color which absorbs said other light rays, said dye being split by said oxidation products of said developer at said silver image to yield a component which couples with said oxidation products to produce a dye image which is also complementary in color to that for which said contiguous layers are sensitized.

2. A photographic element comprising superposed silver halide emulsions sensitized selectively to the primary light rays, two of said emulsions being selectively sensitive to green light and arranged in contiguous layers, one of said layers containing a colorless color former capable of coupling with the oxidation products of a primary aromatic amino developer to yield a magenta dyestuff image in situ with the silver image, said magenta image absorbing light rays other than those for which said emulsion is sensitized, and the other green sensitive layer containing a yellow azo dye capable of absorbing said other light rays, said azo dye having a pyrazolone as a coupling component and said azo dye being split by said oxidation products of said developer at said silver image to regenerate the pyrazolone for coupling with said oxidation products to produce a magenta dyestuff image.

3. A photographic element comprising superposed silver halide emulsions sensitized selectively to the primary light rays, two of said emulsions being selectively sensitive to red light and arranged in contiguous layers, one of said layers containing a colorless color former capable of coupling with the oxidation products of a primary aromatic amino developer to yield a cyan dyestuff image in situ with the silver image, said cyan image absorbing light rays other than those for which said emulsion is sensitized, and the other red sensitive layer containing a red azo dye capable of absorbing said other light rays, said azo dye having a phenol as a coupling component and said azo dye being split by said oxidation products of said developer at said silver image to regenerate the phenol for coupling with said oxidation products to produce a cyan dyestuff image.

4. A multilayer photographic color film in which subtractively colored images are formed in situ with silver images comprising at least four superposed silver halide emulsion layers, only one layer being sensitized to the blue region of the spectrum, two contiguous layers being selectively sensitized to the same primary spectral region other than blue and another layer being selectively sensitized to the third primary spectral region, one of the aforesaid two contiguous layers having dispersed therein a colorless color former capable of coupling with the oxidation products of a primary aromatic amino developer to yield a dyestuff image complementary in color to the light rays for which said layer is sensitized, said image absorbing light rays other than those for which said emulsion is sensitized and the other of said contiguous layers having dispersed therein a non-diffusing color former consisting of an azo dye having a color absorptive of said other light rays and containing a reactive color coupling group, the azo group of said dye being displaced at the silver image by the oxidation products of said primary aromatic amino developing agent to condition said reactive color coupling group for reaction with said oxidation products to yield a dyestuff image also complementary in color to that for which said contiguous layers are sensitized 5. A multilayer photographic color film in which subtractively colored images are formed in situ with silver images comprising at least four superposed silver halide emulsion layers, only one layer being sensitized to the blue region of the spectrum, two contiguous layers being selectively sensitized to the same primary spectral region other than blue and another layer being selectively sensitized to the third primary spectral region, one of the aforesaid two contiguous layers having dispersed therein a colorless color former capable of coupling with the oxidation products of a primary aromatic amino developer to yield a dyestuff image complementary in color to the light rays for which said layer is sensitized, said image absorbing light rays other than those for which said emulsion is sensitized and the other of said contiguous layers having dispersed therein a non-diffusing color former consisting of an azo dye having a color absorptive of said other light rays and characterized by the following general formula:

$$R_1-N=N-R_2$$

wherein R₁ is a member selected from the class consisting of aromatic and heterocyclic radicals, and R₂ represents a color former of the cyan and magenta type usual in the photographic art containing a reactive color coupling group directly attached to the azo linkage, the azo group of said dye being displaced at the silver image by the oxidation products of said primary aromatic amino developing agent to condition said reactive color coupling group for reaction with said oxidation products to yield a dyestuff image also complementary in color to that for which said contiguous layers are sensitized.

6. The process of producing subtractively colored images which comprises exposing a photographic color film comprising superposed silver halide emulsions selectively sensitized to the primary light rays and two of which are arranged in contiguous layers and are selectively sensitized to the same primary spectral region other than blue, one of said layers containing a colorless color former capable of coupling with the oxidation products of a primary aromatic amino developer to yield a dyestuff image in situ with the silver image and complementary in color to that for which said layer is sensitized but absorbing light rays other than those for which said emulsion is sensitized, and the other layer having dispersed therein an azo dye containing in the reactive coupling position a color former directly attached to the azo linkage, developing the emulsions with said primary aromatic amino developing agent while causing destruction of the azo dye at said silver image, and coupling the oxidation product of the developer with the component containing said color forming group and resulting from said destruction and with said colorless color former to produce in each of said contiguous layers a dye image complementary in color to that for which said layers are sensitized.

7. The process of producing color images which comprises exposing superposed photographic silver halide emulsions selectively sensitive to the primary light rays and two of which are arranged in contiguous layers and are selectively sensitive to the same primary spectral region other than blue, one of said contiguous layers containing a colorless color former capable of coupling with the oxidation products with a primary aromatic amino developer to yield a dyestuff image in situ with the silver image complementary in color to the light rays other than those for which said emulsion is sensitized but absorbing light rays other than those for which said emulsion is sensitized, and the other of said layers having dispersed therein a non-diffusing color former consisting of an azo dye having a color absorptive of said other light rays and containing in the reactive coupling position a color forming group directly attached to the azo linkage and selected from the class consisting of active methylene and ethenol groups, developing the emulsions with said primary aromatic amino developing agent while causing destruction of the azo dye at said silver image and coupling the oxidation products of the developer with the component containing said color forming group and resulting from said destruction and with said colorless color former to produce in each contiguous layer a dye image complementary in color to that for which said contiguous layers were sensitized and fixing and bleaching said emulsions.

8. The process of producing color images which comprises exposing superposed photographic silver halide emulsions sensitive selectively to the primary light rays, two of which are arranged in contiguous layers and are selectively sensitive to the same primary spectral region other than blue, one of said layers containing a colorless color former capable of coupling with the oxidation products of primary aromatic amino developer to yield a dyestuff image in situ with the silver image complementary in color to that for which said emulsion is sensitized but absorbing light rays other than those for which said emulsion is sensitized and the other layer having dispersed therein an azo dye having a color absorptive of said other light rays and containing a reactive color coupling group, developing the emulsions with said primary aromatic amino developing agent while causing destruction of the dye at said silver image and coupling the oxidation products of said developer with said component containing said coupling group and resulting from said dye destruction and with said colorless color former to produce in each of said contiguous layers dye images complementary in color to that for which said contiguous layers were sensitized while ensuring that the rate of coupling in each case is substantially the same.

9. The method of improving the color rendition of a multilayer color photographic film in which subtractively colored images are formed in situ with the silver images comprising at least four superposed silver halide emulsion layers, only one layer being sensitized to the blue region of the spectrum, two contiguous layers being selectively sensitized to the same primary spectral region other than blue and another layer being selectively sensitized to the third primary spectral region, which comprises dispersing in one of the aforesaid two contiguous layers a colorless color former capable of coupling with the oxidation products of a primary aromatic amino developer to yield a dyestuff image complementary in color to the light rays for which said layer is sensitized, said emulsion absorbing light rays other than those for which said emulsion is sensitized, and dispersing in the other of said contiguous layers a non-diffusing color former consisting of an azo dye having a color absorptive of said other light rays and containing a reactive color coupling group, exposing said material and developing the same with said primary aromatic amino developer to condition the reactive color coupling group of the azo dye for reaction with the oxidation products of said primary aromatic amino developer and to cause coupling between said oxidation products and said colorless color former to produce in each of said contiguous layers a dye image which is complementary in color to that for which said contiguous layers were sensitized.

10. A photographic element as defined in claim 1 in which the rate of coupling of the oxidation products of said developer with said colorless color former and with said component split from said azo dye are substantially the same.

References Cited in the file of this patent

UNITED STATES PATENTS

| Number | Name | Date |
| --- | --- | --- |
| 2,449,966 | Hanson | Sept. 21, 1948 |